UNITED STATES PATENT OFFICE.

PETER HAUPTMANN AND ALBERT ROHDE, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

AZO DYES FOR WOOL.

1,113,622.  Specification of Letters Patent.  Patented Oct. 13, 1914.

No Drawing.  Application filed September 4, 1913. Serial No. 788,137.

*To all whom it may concern:*

Be it known that we, PETER HAUPTMANN and ALBERT ROHDE, doctors of philosophy, chemists, citizens of the German Empire, residing at Leverkusen, near Cologne-on-the-Rhine, Germany, have invented new and useful Improvements in New Azo Dyes for Wool, of which the following is a specification.

We have found that new and valuable azo dyestuffs for wool having most probably the formula:

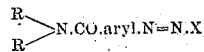

(X meaning the radical of an azo dyestuff component) can be obtained by combining the diazo compounds prepared from aminoarylcarbonylamino compounds having most probably the formula:

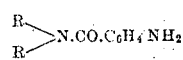

(R stands for a substituent, such as —$CH_3$, —$C_2H_5$, —$C_6H_4$—$CH_3$, —$C_6H_4$—$OCH_3$, —$C_6H_5$, —$C_6H_4Cl$, —$C_{10}H_7$) such as para-aminobenzoylethylanilin, para-aminobenzoyldiphenylamin, meta-aminobenzoyldiphenylamin, para-aminobenzoyl-ethyl-alpha-naphthylamin, meta-aminobenzoyl-ethyl-alpha-naphthylamin, para-aminobenzoylmethyl-beta-naphthylamin, para-amino-anisoyldiphenylamin with azo dyestuff components e. g. pyrazolone sulfonic acids, methylketolsulfonic acids, alpha- and beta-naphthol sulfonic acids, acidyl-periaminonaphthol sulfonic acids, etc.

The new dyes are after being dried and pulverized generally from yellowish to reddish powders soluble in water generally with a yellowish to bluish-red coloration, which dye wool in an acid bath generally from greenish-yellow to bluish-red shades fast to light and to milling. They yield upon reduction with stannous chlorid and hydrochloric acid a disubstituted aminobenzoylamin, such as aminobenzoylethylanilin, aminobenzoyldiphenylamin, aminobenzoylethylcarbazol, aminobenzoyl-ethyl-alpha-naphthylamin, etc., and an aromatic amin e. g. aminopyrazolonesulfonic acid, aminomethylketolsulfonic acid, amino-alpha- or beta-naphtholsulfonic acid, aminoacidylperiaminonaphtholsulfonic acid, etc.

In order to illustrate the new process more fully the following example is given, the parts being by weight:—27 parts of the sulfate of para-aminobenzoyldiphenylamin are diazotized with 24 parts of sulfuric acid (40° Bé.) and with 5 parts of sodium nitrite. The diazo compound is then slowly added to a solution of 16 parts of methylketolsulfonic acid of the formula:

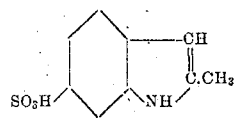

in 300 parts of water, which has been acidulated with 10 parts of sulfuric acid. After fifteen hours' stirring the yellow dyestuff separates, it is filtered off from the acid mixture, mixed with 30 parts of solid soda and dried. After being dried and pulverized it is a yellowish-brown powder, which is soluble in water with a yellowish coloration and which dyes wool very pure yellow shades fast to light and to milling.

The new dyestuff possesses in a free state most probably the formula:

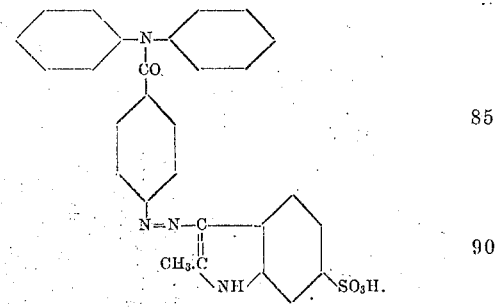

It yields upon reduction with stannous chlorid and hydrochloric acid para-aminobenzoyldiphenylamin melting at 208° C. and aminomethylketolsulfonic acid.

In an analogous manner other dyestuffs of this series can be obtained. The dyestuff obtained from para-aminobenzoylethyl-alpha-naphthylamin and pyrazolone-mono-sulfonic acid is after being dried and pulverized a yellowish powder soluble in water with a greenish-yellow coloration, which dyes wool in an acid bath yellowish shades very fast to light and to milling. Another dye from meta-aminobenzoylethyl-alpha-naphthylamin and 1-benzoylamino-8-naphthol-4.6-disulfonic acid is after being dried and pulverized a brownish-red powder, soluble in water with a bluish-red coloration, which dyes wool in an acid bath a pure bluish-red shade very fast to light and to milling.

We claim:—

1. The herein described new azo dyestuffs having most probably the formula,

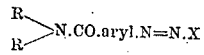

in which R stands for a suitable substituent and X for the radical of an azo dyestuff component, derivable from diazo compounds of disubstituted aminoarylcarbonylamino compounds and azo dyestuff components, which are after being dried and pulverized generally from yellowish to reddish powders soluble in water generally with a yellowish to bluish-red coloration; yielding upon reduction with stannous chlorid and hydrochloric acid a disubstituted aminoarylcarbonylamin and an aromatic amin; and dyeing wool generally from greenish-yellow to bluish-red shades fast to light and to milling, substantially as described.

2. The herein described new azo dyestuffs having most probably the formula:

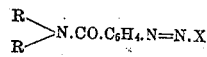

in which R stands for a suitable substituent and X for the radical of an azo dyestuff component, and being derivable from diazo compounds of disubstituted aminobenzoylamino compounds and azo dyestuff components, which are after being dried and pulverized generally from yellowish to reddish powders soluble in water generally with a yellowish to bluish-red coloration; yielding upon reduction with stannous chlorid and hydrochloric acid a disubstituted aminobenzoylamin and an aromatic amin; and dyeing wool generally from greenish-yellow to bluish-red shades fast to light and to milling, substantially as described.

3. The herein described new azo dyestuffs having most probably the formula,

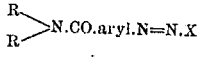

in which R stands for an aryl radical and X for the radical of an azo dyestuff component, derivable from diazo compounds of diarylaminoarylcarbonylamino compounds and azo dyestuff components, which are after being dried and pulverized generally from yellowish to reddish powders soluble in water generally with a yellowish to bluish-red coloration; yielding upon reduction with stannous chlorid and hydrochloric acid a diarylaminoarylcarbonylamin and an aromatic amin; and dyeing wool generally from greenish-yellow to bluish-red shades fast to light and to milling, substantially as described.

4. The herein described new azo dyestuffs having most probably the formula,

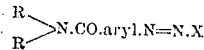

in which R stands for a suitable substituent and X for the radical of a ketol sulfonic acid, derivable from diazo compounds of disubstituted aminoarylcarbonylamino compounds and ketol sulfonic acids, which are after being dried and pulverized generally from yellowish to reddish powders soluble in water generally with a yellowish to bluish-red coloration; yielding upon reduction with stannous chlorid and hydrochlorid acid a disubstituted aminoarylcarbonylamin and an aminoketol sulfonic acid; and dyeing wool generally from greenish-yellow to bluish-red shades fast to light and to milling, substantially as described.

5. The herein described new azo dyestuff having most probably the formula:

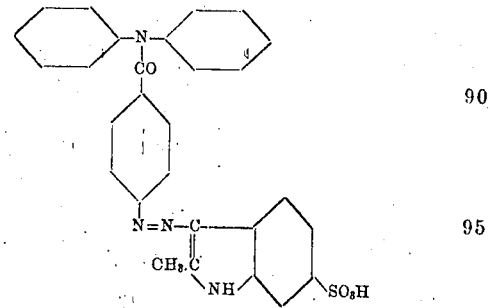

which is after being dried and pulverized a yellowish-brown powder soluble in water with a yellowish coloration; yielding upon reduction with stannous chlorid and hydrochloric acid para-aminobenzoyldiphenylamin and amino-methylketolsulfonic acid; and dyeing wool from an acid bath pure yellow shades fast to light and to milling, substantially as described.

In testimony whereof we have hereunto set our hands in the presence of two subscribing witnesses.

PETER HAUPTMANN. [L. S.]
ALBERT ROHDE. [L. S.]

Witnesses:
ALBERT KEIFER,
JULIUS FESTNER.